Patented June 22, 1943

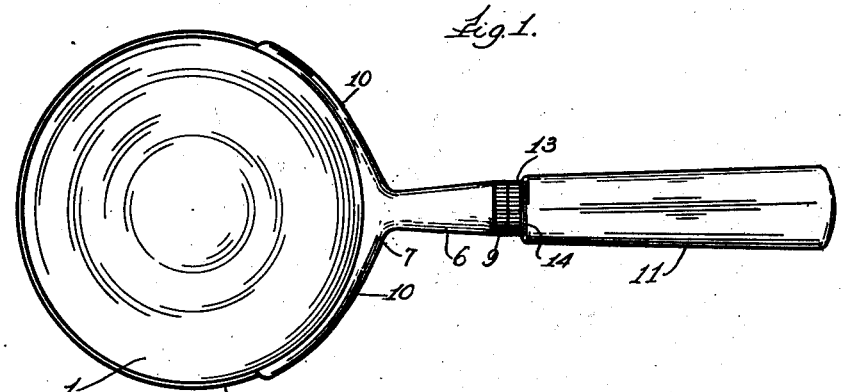
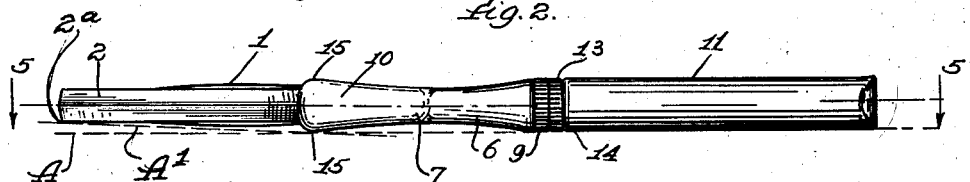
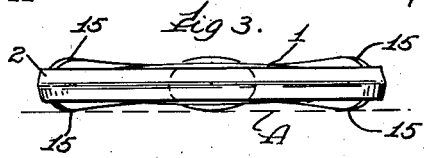
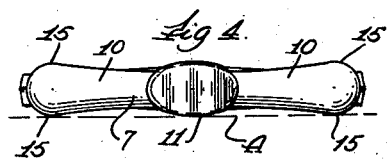
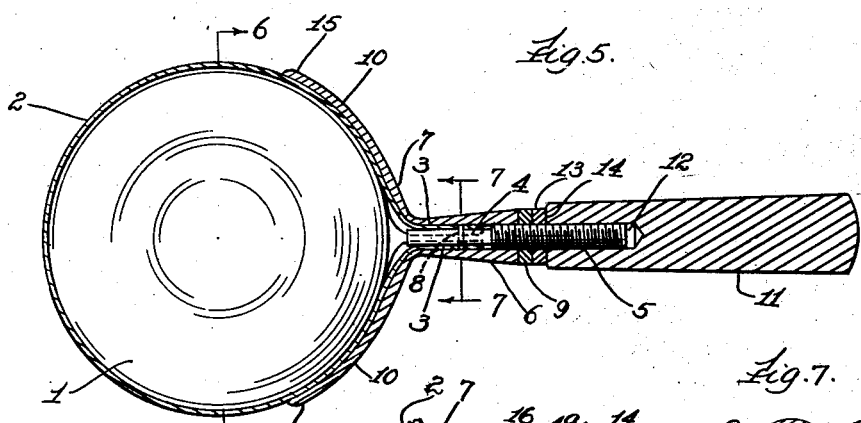
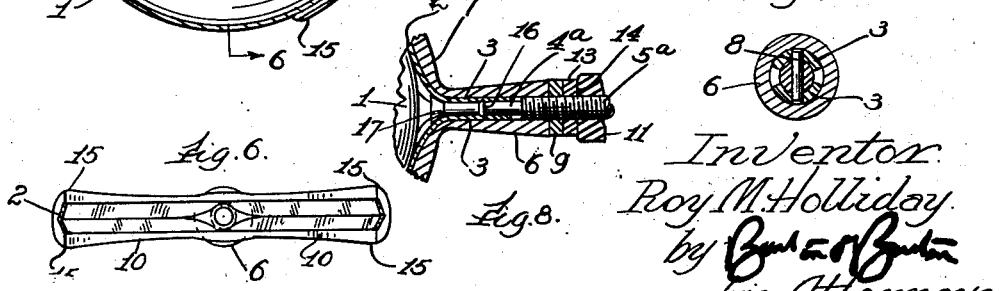

2,322,441

UNITED STATES PATENT OFFICE 2,322,441

READING GLASS

Roy M. Holliday, Oak Park, Ill.

Application July 27, 1940, Serial No. 347,871

1 Claim. (Cl. 88—39)

This invention relates to reading glasses and is shown as applied to the type of glass which includes a lens, a supporting rim and a handle by which the lens may be held in convenient relation to reading matter or other material which is being examined. One object of the invention is to provide means for insuring a snug fit of the rim around the edge of the lens which it secures. Another object is to allow for adjustment of the rim to compensate for any lack of uniformity in the size of lenses or irregularities in the outlines thereof. A further object is to provide a rim structure and handle designed to support the surface of the lens out of contact with a flat surface, such as a table top, on which the device may rest when not in use. It is also an object of the invention to provide a construction which can be economically manufactured and easily and rapidly assembled.

The invention consists in certain features and elements of construction in combination, as herein shown and described and as indicated by the claim.

In the drawing:

Figure 1 is a plan view of a reading glass embodying this invention.

Figure 2 is a side elevation of the same.

Figure 3 is an end view looking toward the rim which encloses the lens.

Figure 4 is an end view looking toward the handle.

Figure 5 is a plan section taken substantially as indicated at line 5—5 on Figure 2.

Figure 6 is a section taken as indicated at line 6—6 on Figure 5.

Figure 7 is a detail section taken as indicated at line 7—7 on Figure 5.

Figure 8 is a fragmentary sectional view taken at the same plane as Figure 5 but showing a modified construction.

In the form illustrated, the reading glass embodying this invention includes a lens 1 of substantially circular outline, with a metallic rim 2 encompassing the lens. The rim is of channeled or V-shaped cross-section, as seen in Figure 6, so that the edge of the lens will tend to be seated in the middle portion of the channel. The rim 2 includes integral terminal portions 3 which extend in substantially parallel relation to each other and spaced apart at opposite sides of an extended radius of the lens 1. With the circular portion of the rim embracing the lens 1, the terminals 3 are fitted over the reduced portion 4 of a threaded metallic stem 5. This stem 5 is then inserted through the hollow shank 6 of a yoke 7. As shown in Figure 5, the stem carries a cross-pin 8 which engages holes in the terminals 3 of the rim so that by tightening a nut 9 on the threaded stem 5 against the end of the shank 6, the terminals 3 are drawn into the hollow shank, and the circular portion 2 of the rim is tightened around the lens 1.

The shank 6 is formed with a pair of oppositely extending curved arms 10, 10 which are of channeled cross-section to receive the portions of the rim 2 adjacent its terminals 3, 3, thus reinforcing the rim and bracing it in relation to the shank 6. A handle 11 of any suitable material has a threaded bore 12 which fits the threaded stem 5, and, preferably, a lock nut 13 is applied to the stem 5 so that by slight adjustment of the nut 13 against the terminal shoulder 14 of the handle the latter may be secured firmly on the threads of the stem 5.

In addition to their bracing function, a special purpose of the arms 10 of the yoke 7 is to serve as a rest for the lens when not in use. The outer ends of the arms are made substantially wider than the rim 2 and wider than the thickness of the lens at its center, so that when the reading glass is laid down upon a flat surface, as indicated by the line A in Figure 2, the rounded corners 15 of these widened ends of the yoke arms rest upon the surface but support the lens itself entirely out of contact therewith. The weight of the handle 11 and the distance of its center of gravity from these fulcrum points 15 insure that the handle will overbalance the weight of the lens 1 and thus hold it above the supporting surface A. However, even if the glass should be rocked about the points 15, 15 so as to tilt the handle upward and bring the outer side of the rim at 2ª down onto the supporting surface, the relation of the points 15, 15 and 2ª is such that the under side of the lens would be held away from the supporting surface, as indicated by the line A¹ in Figure 2. In this manner the polished surfaces of the lens are safeguarded against becoming scratched by contact with a desk or table surface, and may be kept indefinitely in perfect working condition.

Figure 8 illustrates a modified construction which substitutes for the pin 8 a sharp-edged flange 16 formed on the reduced portion 4ª of the stem 5ª. When the terminals 3, 3 of the rim 2 are forced into the bore of the shank 6 the sharp edge of the flange 16 impresses itself in the material of the terminals 3, 3 and thus forms grooves in which it secures a firm bite;

or, if preferred, the grooves may be previously formed to receive the flange 16. In either case the interlocking engagement of the flange and grooves provides means by which the terminals 3 may be drawn snugly into position when the nut 9 is tightened. Preferably, the end of the reduced portion 4ᵃ is formed with a head 17 having a conical surface which engages the bent portions of the rim at which the terminals 3 join the encircling portion. This flared, conical head thus cooperates with the flared end of the bore of the shank 6 to clamp the rim terminals firmly to the shank when the nut 9 is tightened.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claim.

I claim as my invention:

In combination with a lens, a flexible rim encircling the lens and having a pair of integral terminals extending in substantially radial direction away from the lens, a stem embraced between said terminals and having a threaded portion, said stem and terminals having transaxial abutment means by which they are interengaged, a shank having a bore in which the stem and terminals are snugly fitted, whereby their abutment means are held in engagement, said threaded portion of the stem protruding from said shank, a nut adjustable thereon against the end of the shank to tighten the rim around the lens by drawing said stem and terminals through the bore of the shank, said threaded portion of the stem projecting beyond said nut, and a handle having a threaded bore by which it is secured on the projecting part of the stem.

ROY M. HOLLIDAY.